(12) United States Patent
Paasch

(10) Patent No.: US 9,457,772 B2
(45) Date of Patent: Oct. 4, 2016

(54) INFLATION APPARATUS AND METHODS

(75) Inventor: Robert W. Paasch, Wilder, ID (US)

(73) Assignee: Paasch Products, Inc., Wilder, ID (US)

( * ) Notice: Subject to any disclaimer, the term of this patent is extended or adjusted under 35 U.S.C. 154(b) by 31 days.

(21) Appl. No.: 14/239,514

(22) PCT Filed: Aug. 18, 2011

(86) PCT No.: PCT/US2011/048319
§ 371 (c)(1),
(2), (4) Date: Feb. 18, 2014

(87) PCT Pub. No.: WO2013/025223
PCT Pub. Date: Feb. 21, 2013

(65) Prior Publication Data
US 2014/0166155 A1    Jun. 19, 2014

(51) Int. Cl.
*B29C 73/16* (2006.01)
*B60S 5/04* (2006.01)

(52) U.S. Cl.
CPC .............. *B60S 5/04* (2013.01); *B29C 73/166* (2013.01)

(58) Field of Classification Search
CPC .............................. B60S 5/04; B29C 73/166
USPC ............................................ 141/38; 152/415
See application file for complete search history.

(56) References Cited

U.S. PATENT DOCUMENTS 6,019,145 A * 2/2000 Savidge .......................... 141/38
6,345,650 B1   2/2002 Paasch
6,889,723 B2 * 5/2005 Gerresheim et al. ........... 141/38
6,968,869 B2 * 11/2005 Eckhardt ......................... 141/38
D613,320 S  * 4/2010 Marini ......................... D15/199
7,878,360 B2 * 2/2011 Takeda ..................... 220/203.13
7,891,385 B2 * 2/2011 Yanagi et al. ................... 141/38
8,016,002 B2 * 9/2011 Yoshida et al. ................. 141/38
8,201,586 B2 * 6/2012 Yoshida et al. ................. 141/38
8,226,377 B2 * 7/2012 Yoshida et al. ............... 417/151
8,302,636 B2 * 11/2012 Sekiguchi ....................... 141/38
8,413,692 B1 * 4/2013 Hickman et al. ............... 141/38
8,453,683 B2 * 6/2013 Yoshida et al. ................. 141/38

(Continued)

FOREIGN PATENT DOCUMENTS

JP    2008-126580    6/2008
JP    2008-155605    7/2008

(Continued)

OTHER PUBLICATIONS

WO PCT/US2011/046319 Search Rept., Mar. 30, 2012, Paasch Products, Inc., et al.

(Continued)

*Primary Examiner* — Nicolas A Arnett
(74) *Attorney, Agent, or Firm* — Wells St. John P.S.

(57) ABSTRACT

A repair device and method comprising a canister having an internal cavity, an input connecting valve, an output connecting valve, and an output hose for purposes of inflating a pneumatic device such as a flat tire. The utility of this device is as a readily available bridge to connect a deflated tire with any available air source such as an inflated tire. A sealing mixture may be stored in the internal cavity of the canister for injection into a leaking or flat tire to effect repairs by sealing any leaks. When attached between an inflated tire and a flat tire, the sealing mixture is injected into the flat tire by the pressure of the inflated tire and the flat tire may then be inflated.

8 Claims, 6 Drawing Sheets

(56) References Cited

U.S. PATENT DOCUMENTS

| | | | |
|---|---|---|---|
| 8,459,150 B2* | 6/2013 | Yoshida et al. | 81/15.6 |
| 2003/0056851 A1* | 3/2003 | Eriksen et al. | 141/38 |
| 2005/0191193 A1* | 9/2005 | Chou | 417/437 |
| 2006/0086403 A1* | 4/2006 | Kant et al. | 141/38 |
| 2008/0145245 A1* | 6/2008 | Chou | 417/415 |
| 2008/0230142 A1* | 9/2008 | Hickman | 141/38 |
| 2009/0277534 A1* | 11/2009 | Yoshida et al. | 141/38 |
| 2010/0224281 A1* | 9/2010 | Yoshida et al. | 141/38 |
| 2011/0041951 A1* | 2/2011 | Lolli | 141/38 |

FOREIGN PATENT DOCUMENTS

| | | |
|---|---|---|
| JP | 2010-162697 | 7/2010 |
| WO | PCT/US2011/048319 | 2/2014 |

OTHER PUBLICATIONS

WO PCT/US2011/048319 Written Opin, Mar. 30, 2012, Paasch Products, Inc., et al.

* cited by examiner

INFLATION APPARATUS AND METHODS

RELATED PATENT DATA

This application is a 35 U.S.C. §371 of and claims priority to PCT International Application Number PCT/US2011/048319, which was filed 18 Aug. 2011 (18.08.2011), and was published in English, the entirety of which is incorporated herein by reference.

TECHNICAL FIELD

This invention relates to portable and reusable tire inflator products and methods for inflating and sealing tires and other pneumatic systems.

BACKGROUND

Various small portable devices are currently available for use by motorists to internally seal and inflate pneumatic tires that have lost air due to puncture or leak. These devices typically consist of canisters of pressurized propellant gas and tire sealant which are removably connected to an inflation valve of a tire. Such devices are subject to several well-known limitations and disadvantages.

Prior art devices sought to maximize the convenience of their use and storage by minimizing their size. This has resulted in devices which store their contents at extremely high pressure, and which present a safety hazard. These high-pressure devices are susceptible to high temperatures, and therefore may burst and cause injury when left in extreme environments, such as a car on a hot summer day.

Other prior art devices sought to reduce the risk of injury by lowering the internal pressure and/or increasing the size of the canisters. This results in a less convenient device that is heavier and bulkier and/or one that carries less gas. Lower pressure canisters often are unable to fully inflate a flat tire. Other devices increase the gas content of canisters by removing sealing mixture to allow for more expanding gas. This results in reduced puncture or leak sealing effectiveness.

Another problem with prior art devices is their reliance on hazardous propellant gasses. Historically, ozone-depleting gasses were frequently used due to their high rate of expansion. Modernly, highly flammable propellants, such as methane and butane, are often used. Non-combustible propellant gasses may also be used, but yield lower expansion, and therefore often fail to provide enough gas to inflate a standard tire. Each of these propellant gasses have undesirable properties which make their use disadvantageous.

One prior art device, the Jaksa device (U.S. Pat. No. 5,908,145), teaches of an apparatus similar to the present invention. The Jaksa device, however, has numerous design flaws which limit its usefulness. First, the Jaksa device is simply a "tire sealant dispensing apparatus." Thus, it is designed and useful only for the injection of tire sealant, and does not contemplate inflation of a flat tire. Second, the claimed purpose of the Jaksa device is to inject sealant into a tire to prevent future blowouts and punctures. The device is not intended to be used on a tire which has already experienced a blowout or puncture. The device does not provide or allow for air to inflate a flat tire.

Significantly, the Jaksa device is only usable at angles between horizontal and vertical; but not at angles which are purely horizontal and purely vertical. The present invention differs from the Jaksa device because it is specifically adapted to be used at a purely vertical angle.

Several prior art devices, the Crowley device (U.S. Pat. No. 4,653,550), the Vitack device (U.S. Pat. No. 3,934,622), and the Wells device (U.S. Pat. No. 5,765,601), contemplate storing compressed gas within the devices themselves. Inherent within these devices is the danger of explosion which accompanies storing contents at high pressure. These devices operate in contrast to the present invention which does not store its contents at high pressure. Rather, the present invention merely operates as a conduit, conducting compressed gas directly from an air source to a deflated device.

One prior art device, the Boetger device (U.S. Pat. No. 4,489,885) similarly operate as a mere conduit between an air source and a deflated device, but the Boetger device differs from the present invention because it does not incorporate a tire sealing mixture. The Boetger device operates merely to inflate a deflated device, and not to inflate and repair it, as does the present invention.

In view of the forgoing it is evident a need exists for a new product and method for effecting repair of tires and providing for inflation of tires and other pneumatic systems.

SUMMARY

An embodiment of the disclosure provides a bottle-shaped canister with a top, a base, and an internal cavity containing a sealant solution. An inlet port is disposed at the top and an outlet port is disposed at the base. The base is adapted to support the bottle-shaped canister at a purely vertical angle when it is placed upon any surface. An input connecting valve is attached to said inlet port, and an output hose, having a first end and a second end, is attached by its first end to said outlet port. An output connecting valve is disposed at said second end of said output hose.

In accordance with example implementations, a deflated device may be inflated by injecting the sealant solution into the deflated device, and filling it with air. The bottle-shaped canister itself may not be pressurized, but rather an external air source provides positive pressure to inject the sealant solution and inflate the device. The external air source can be removably attached to the input connecting valve, while the deflated device is removably attached to the output connecting device.

Canister(s) of compressed air and/or an air compressor may be utilized as air sources, but air sources such as other inflated tires may be used as well.

The present invention is reusable, in contrast to prior art devices which are strictly disposable. Although the device may be manufactured cheaply enough to be used in a disposable manner, the present invention contemplates multiple uses. After an initial use, the container may be re-filled with additional sealant mixture for future uses. This provides for minimal waste, thus benefiting the environment.

Numerous benefits are realized by the present invention. One benefit is safe storage. The sealing mixture may be stored at low pressure, and is not susceptible to explosion when heated. Another benefit is reusability. Once the sealing mixture has been expelled from the canister, the invention may be refilled and reused. Another benefit is the wide availability of potential air sources. Any tire from a vehicle, including the spare or even tires from a second vehicle, may be used to provide air to a flat tire.

Other advantages include but are not limited to: The invention may be reused with or without sealing mixture yielding a useful product even after the sealing mixture has been depleted; the invention provides a small and lightweight device for tire repair and re-inflation; the invention provides an environmentally friendly emergency repair device; and an emergency repair device with long term secondary uses.

BRIEF DESCRIPTION OF THE DRAWINGS

Preferred embodiments of the disclosure are described below with reference to the following accompanying drawings.

DESCRIPTION

Figure 1:
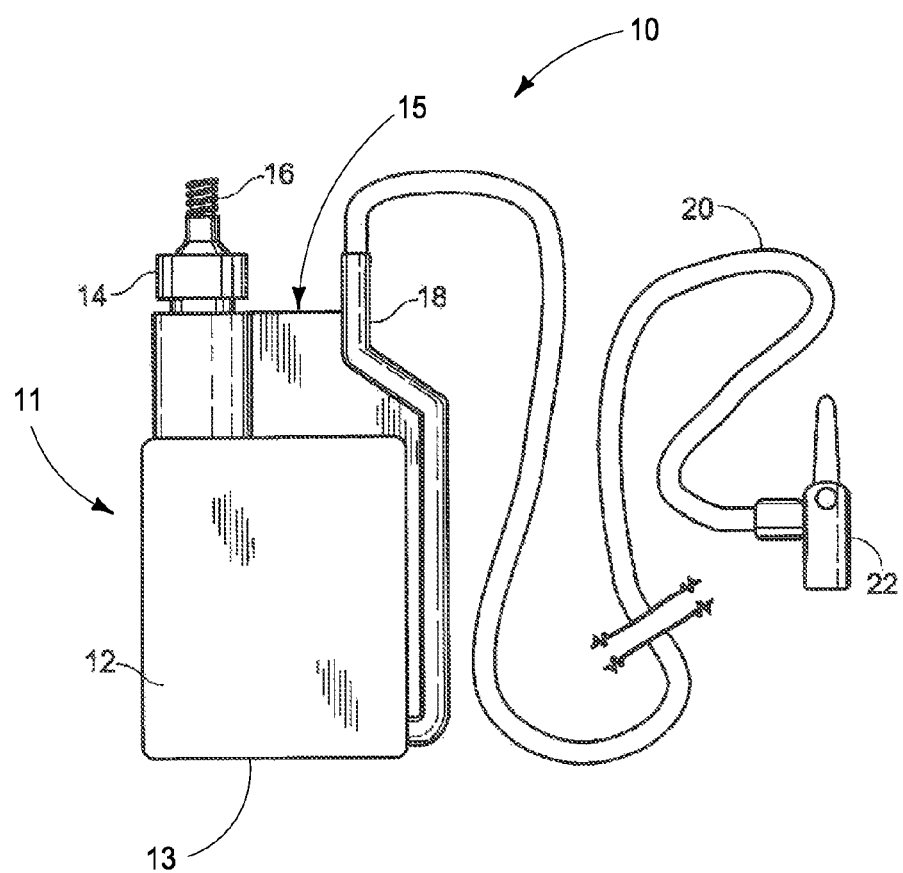
FIG. 1 is a frontal view illustrating the design features of the present invention.

Inflation apparatuses and methods will be described with reference to FIGS. 1-4. Referring first to FIG. 1 an inflation apparatus 10 according to an embodiment is depicted. Apparatus 10 includes embodiment a reservoir 11 defined by a housing 12. Apparatus 10 can have an inlet port 14, and an outlet port 18. A hose 20 may be irreversibly coupled to port 18 and include an output connecting valve 22. An input valve 16 may be attached to the canister housing 12 at the inlet port 14.

Reservoir 11 may be constructed of a metal such as an aluminum or a plastic such as a polybutylene for example. In accordance with example implementations, port 18 can extend and be coupled proximate a base 13 of apparatus 10 forming a separate conduit extending to reservoir 11. According to one aspect, port 14 can be associated with a top 15 of apparatus 10 and can be configured to receive a liquid sealant material such as a tire sealant.

Apparatus 10 can be configured for inflating a deflated pneumatic device. Apparatus 10 can be a bottle-shaped canister having a top, a base, and an internal cavity. The base can be adapted to sit upon a plane and support said bottle-shaped canister at a substantially vertical angle and perpendicular to said plane, for example. The bottle-shaped canister can be constructed of a substantially rigid material or semi-rigid flexible material.

The inlet port can be disposed at the top, and an outlet port can be disposed at the base. The apparatus can also include an input connecting valve attached to said bottle-shaped canister at said inlet port, and an output hose having a first end and a second end, with the first end of said output hose being attached to said bottle-shaped canister at the outlet port. The output hose is comprised of a substantially flexible material. The output hose may be removably attached to said canister at said outlet port. The second end of the output hose end may be attached to an output connecting valve, for example.

The apparatus may further be coupled to a compressed gas source attached at the input connecting valve, with the compressed gas source comprising a volume of gas sufficient to inflate said deflated device. The input connecting valve may be removably attached to said canister. The compressed gas source can be removably attached to said input connecting valve.

In accordance with some implementations, the output connecting valve may be attached to a deflated pneumatic device. The output connecting valve may be removably attached to a deflated pneumatic device specially adapted to be operative between two or more automotive type tires In accordance with alternative embodiments and with reference to FIGS. 2 and 3, apparatus 30 is shown that includes a reservoir 32 defined by an exterior housing 34. Reservoir 32 can have openings 36 and 38 for example within the exterior of the housing the openings defined respectively by nipples 40 and 42 recessed within the exterior of housing 34. Apparatus 30 can further include an interior wall 44 defining an output chamber 48 and an input chamber 50 within reservoir 32, interior wall 44 and exterior housing 34 defining an opening 52 between the chambers 48 and 50. The housing of the reservoir defines a base 54 as well as a top 56. According to example implementations, opening 52 can be defined by wall 44 and base 54.

In accordance with example implementations, apparatus 30 can contain a sealant solution 58 within reservoir 32 and extending between chambers 48 and 50 via opening 52. Solution 58 can completely fill opening 52 between chambers 48 and 50, for example. The sealant solution may be any sealing material or combinations of sealing materials, including rubber based sealant or acrylic latex materials, such as commonly used in the relevant art.

In accordance with another aspect of the disclosure, reservoir housing 34 can further define at least one flange 60. Flange 60 can form all or part of base 54, for example. In accordance with other aspects, housing 34 can define two flanges 60 and 62 with flange 62 associated or forming all or substantially all of top 56.

Figure 2:
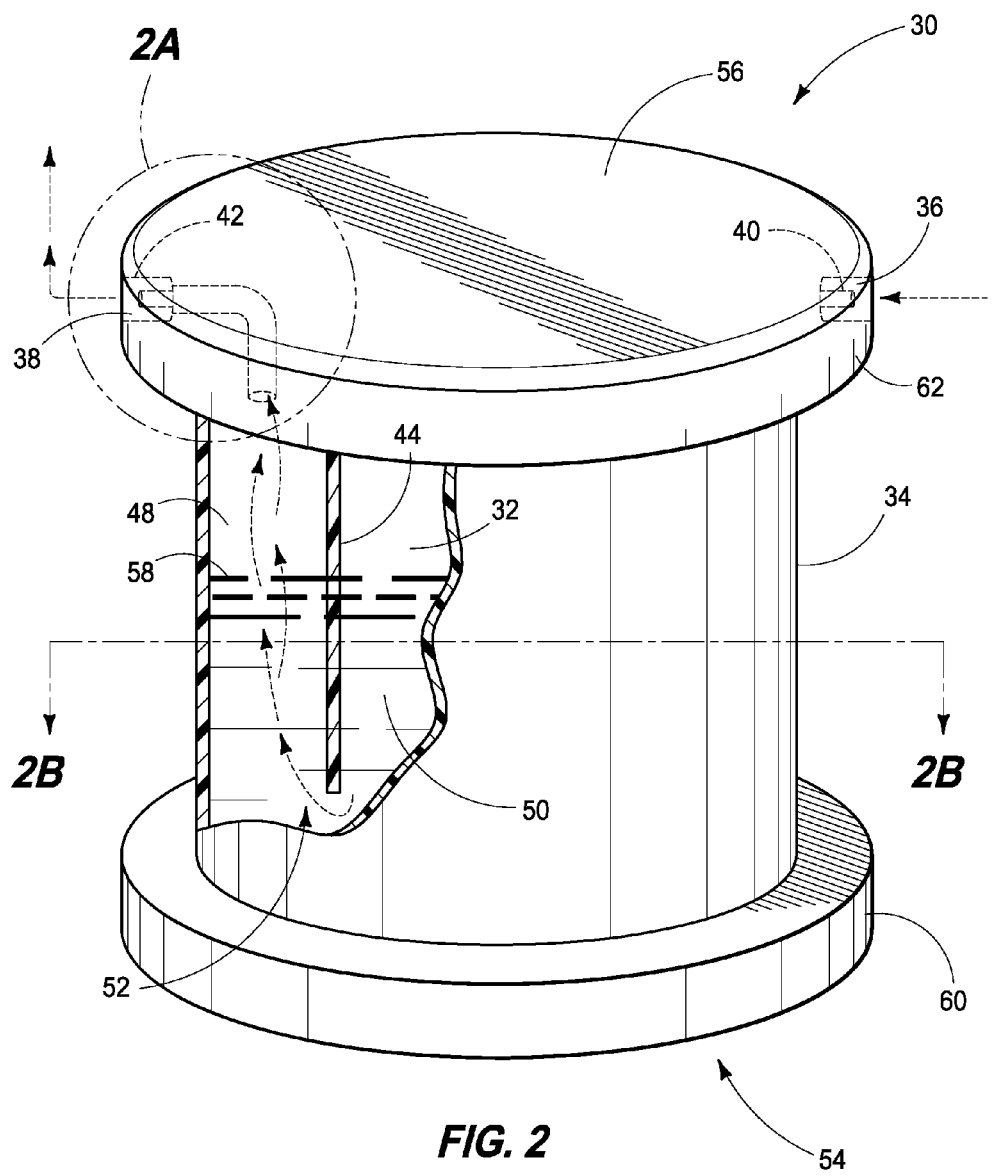
FIG. 2 is a perspective view illustrating the use of the invention as applied between two tires of a vehicle.
Figure 2A:
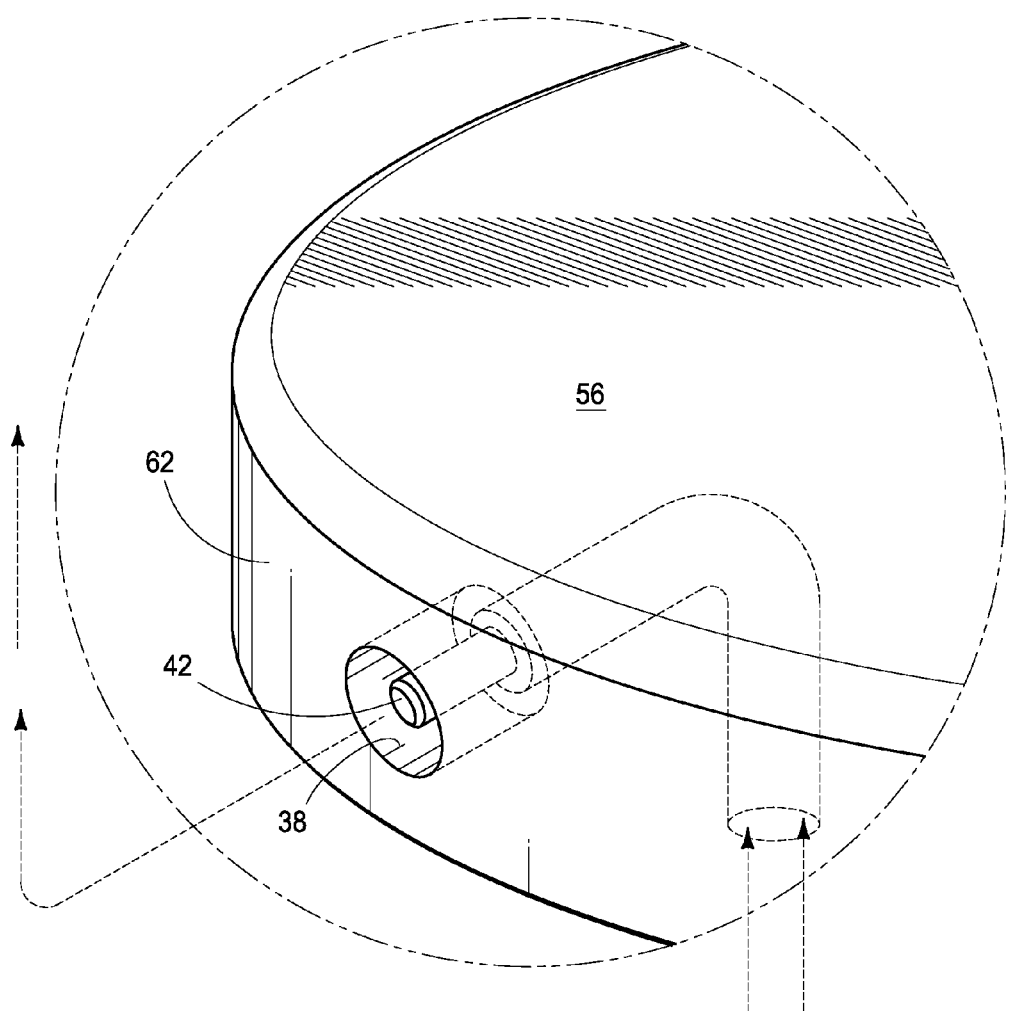

Referring to FIG. 2A, nipple 42 can define opening 38 and both opening 38 and nipple 42 can be recessed within the outer wall of flange 62 for example. In accordance with example implementations, this may prevent nipple 42 from being damaged during transport or use. Nipple 42 as well as all other nipples of the apparatus can be configured to irreversibly couple with tubing or reversibly couple with tubing for example via the configuration with barbs or humps to engage tubing. In accordance with example embodiments, apparatus 30 can include caps configured to at least partially close the recess around the nipples and engage the openings to prevent sealant solution from exiting the reservoir. One or both of the openings can be configured with caps in this fashion.

Figure 2B:
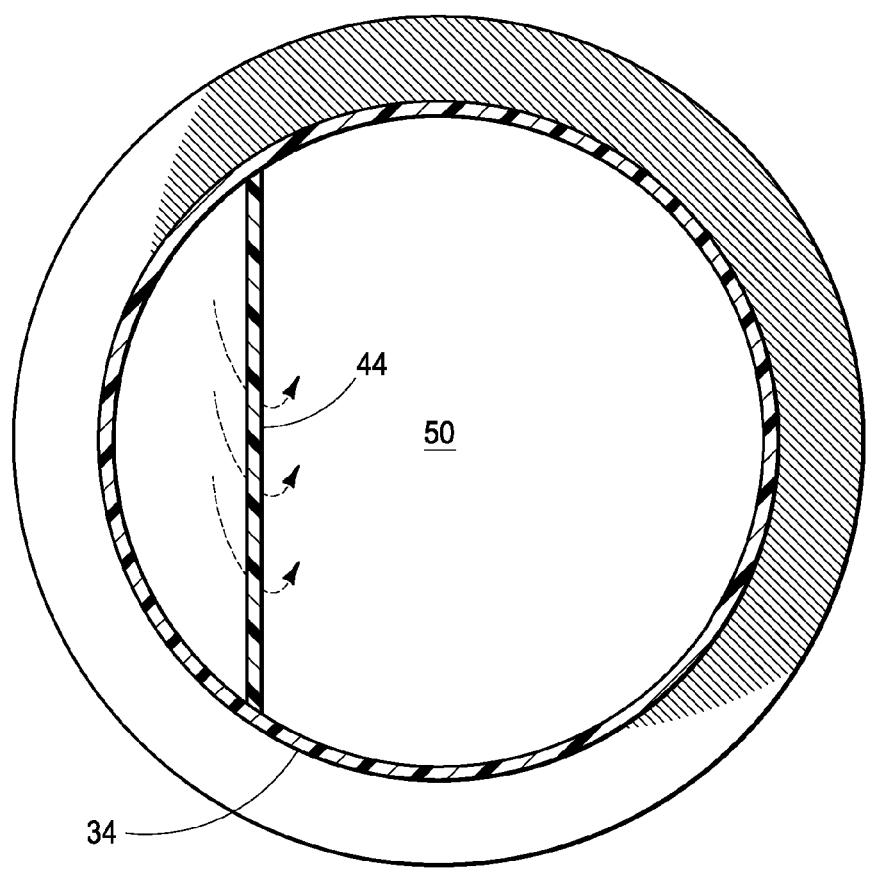

Referring to FIG. 2B, one cross section according to an embodiment is depicted showing wall 44 between chambers 48 and 50 bound by housing 34.

Figure 3:
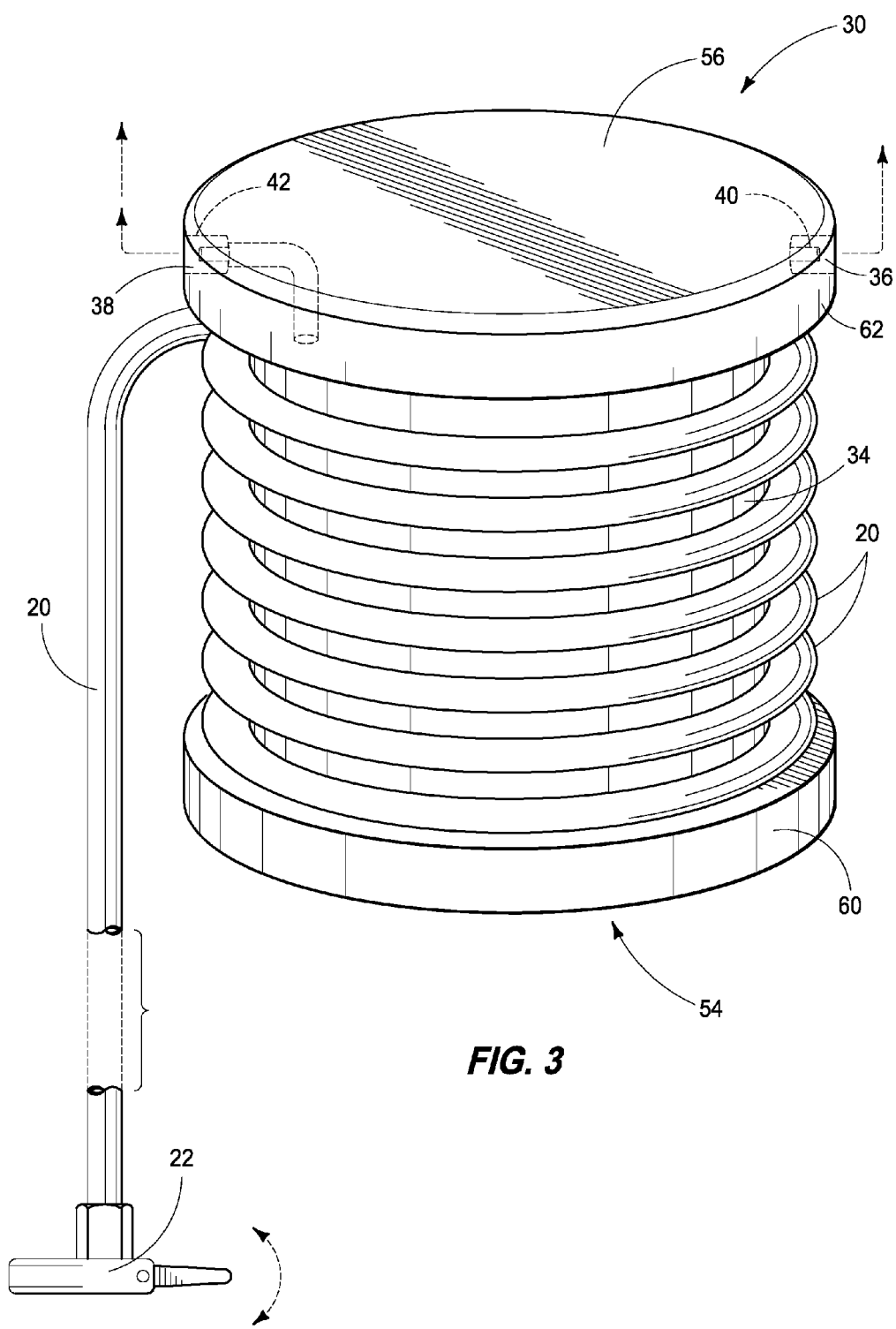
FIG. 3 is an inflation apparatus according to an embodiment.

Referring to FIG. 3, in the two flange configuration, housing 34 can define a spool and the spool can be configured to receive tubing, for example. The set of coiled tubing can include at least two separate lengths of tubing for example, one length configured to be coupled to inlet port 36 and the other length configured to be coupled to outlet port 38. Wherein caps may be removed from the respective ports, if present, the respective lengths of tubing attached and the respective ends the tubing coupled with the respective inflated and deflated assemblies to facilitate inflation of the deflated assembly.

The input and output connecting valves may be any type commonly used on relevant art pneumatic devices such as push on type valves, thumb-lock valves, or any other valve assembly including screw on, locking, or needle assemblies adapted for attachment to the valve stems commonly found on automobile tires and other pneumatic devices. Output connecting valve can be a lever-action thumb-lock valve assembly, while the input connecting valve can be a Schrader-type valve, for example. The input connecting valve may be removably attached to the canister by means of a threaded sleeve.

The bottle-shaped canister can have an internal cavity large enough to hold an amount of sealing mixture sufficient to seal a standard automobile tire. The canister may be constructed of either lightweight or heavyweight material, such as plastic or other suitable material, and it may be either substantially rigid or flexible. The canister should be strong enough to withstand the pressure exerted by the external air source. High-pressure systems of 180 psi or greater may be built, however common uses for automobiles allow for lower pressure systems.

The output hose can be flexible, for example, and able to withstand the pressure exerted by the external air source. Any plastic, vinyl multi-layer or rubber type hose with the capacity to hold sufficient pressures, usually greater than 26 psi, may be used.

As an example, inflation methods can include inflating a deflated pneumatic device by connecting said deflated pneumatic device to a compressed gas source by means of a device having a bottle-shaped canister having a top, a base, and an internal cavity. The base can be adapted to sit upon a plane and support said bottle-shaped canister at a purely vertical angle and perpendicular to said plane. The device can have an inlet port disposed at said top, and an outlet port disposed at said base. The device can further have an input connecting valve attached to said bottle-shaped canister at said inlet port, an output hose having a first end and a second end, with the first end of said output hose being attached to said bottle-shaped canister at said outlet port, with the second end of said output hose end being attached to an output connecting valve. The device can include a compressed gas source attached at said input connecting valve, with the compressed gas source comprising a volume of gas sufficient to inflate said deflated device. The method can also include injecting a sealing mixture comprising a sealing material contained in said internal cavity of said bottle-shaped canister into the deflated pneumatic device.

Figure 4:
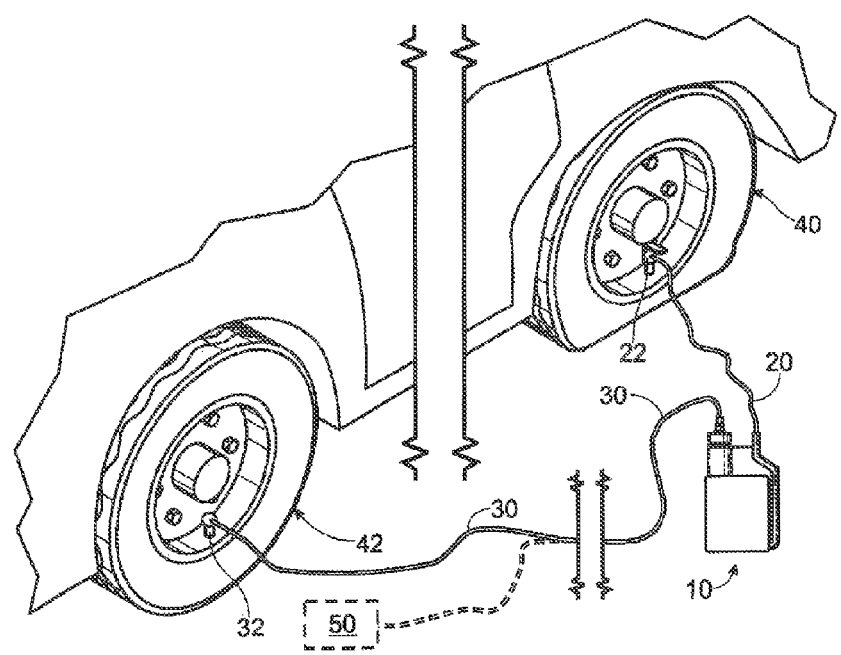
FIG. 4 is an inflation apparatus according to an embodiment.

FIG. 4 depicts use of the invention between two tires of a vehicle. The invention is applied between a first tire acting as an air source 42 and a second tire needing air 40. The first tire acting as an air source 42 is connected to the canister by means of an input hose 30. The input hose 30 is removably attached to the first tire acting as an air source 30 at the inflation valve 32, and is removably attached to the canister 10 at the input connecting valve 16. An alternative air source 50 may be used in lieu of the first tire acting as an air source 42. The second tire needing air 40 is connected to the canister by means of the output hose 20. The output hose 20 is removably attached to the second tire needing air 40 at the output connecting valve 22, and is removably attached to the canister 10 at the outlet port 18.

What is claimed is:

1. An inflation apparatus comprising:
    a reservoir defined by an exterior housing;
    two openings within the exterior of the housing and at opposing sides of the housing, the openings defined by nipples recessed within the exterior of the housing; and
    an interior wall defining two chambers within the reservoir, the interior wall and the exterior housing defining an opening between the two chambers.

2. The inflation apparatus of claim 1 wherein the housing of the reservoir defines a base, the opening between the two chambers being defined by the interior wall and the base of the reservoir.

3. The inflation apparatus of claim 1 further comprising a sealant solution within the reservoir.

4. The inflation apparatus of claim 3 wherein the sealant solution completely fills the opening between the two chambers.

5. The inflation apparatus of claim 1 wherein the exterior housing further defines at least two opposing flanges.

6. The inflation apparatus of claim 1 wherein the exterior housing defines a spool, each of the openings being along apposing edges of one of the two opposing flanges.

7. The inflation apparatus of claim 1 further comprising a set of tubing coiled upon the exterior housing.

8. The inflation apparatus of claim 7 wherein the set of tubing comprises at least two separate lengths of tubing.

* * * * *

UNITED STATES PATENT AND TRADEMARK OFFICE
CERTIFICATE OF CORRECTION

PATENT NO. : 9,457,772 B2  Page 1 of 1
APPLICATION NO. : 14/239514
DATED : October 4, 2016
INVENTOR(S) : Robert W. Paasch It is certified that error appears in the above-identified patent and that said Letters Patent is hereby corrected as shown below:

On the Title Page

(56) References Cited – Replace:
"WO PCT/US2011/046319 Search Rept., Mar. 30, 2012, Paasch Products, Inc., et al."

With:
--WO PCT/US2011/048319 Search Rept., Mar. 30, 2012, Paasch Products, Inc., et al.--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*